United States Patent [19]

Turricchia

[11] Patent Number: 5,057,271
[45] Date of Patent: Oct. 15, 1991

[54] PROTECTION SYSTEM FOR THE BASEMAT REACTOR CONTAINMENT BUILDINGS IN NUCLEAR POWER STATIONS

[75] Inventor: Arnaldo Turricchia, Rome, Italy

[73] Assignee: Enel-Ente Nazionale Per L'Energia Elettrica, Rome, Italy

[21] Appl. No.: 508,074

[22] Filed: Apr. 10, 1990

[30] Foreign Application Priority Data

Apr. 13, 1989 [IT] Italy .................................. 20115 A/89

[51] Int. Cl.⁵ .............................................. G21C 9/00
[52] U.S. Cl. ................................................... 376/280
[58] Field of Search ............................. 376/280, 279

[56] References Cited

U.S. PATENT DOCUMENTS

| | | | |
|---|---|---|---|
| 3,607,630 | 9/1971 | West et al. ......................... | 376/280 |
| 3,964,966 | 6/1976 | Lampe ................................ | 376/280 |
| 4,036,688 | 7/1972 | Golden et al. ..................... | 376/280 |
| 4,116,764 | 9/1978 | Jones ................................. | 376/280 |
| 4,280,872 | 7/1981 | Ferrari et al. ..................... | 376/280 |

Primary Examiner—Brooks H. Hunt
Assistant Examiner—Frederick H. Voss
Attorney, Agent, or Firm—Hedman, Gibson, Costigan & Hoare

[57] ABSTRACT

A protection system for the basemat of reactor containment buildings in nuclear power stations. The system comprises a structure located in a cavity below the reactor vessel and submerged in water. The structure comprises staggered layers of stainless steel beams for intercepting molten material escaping from the reactor vessel during meltdown of the reactor core. The system is designed so that the molten material is distributed in thin layers over wings of the beams and transfers its heat to the surrounding water thus affording a rapid quenching of the molten core and safeguarding the integrity of the basemat.

16 Claims, 7 Drawing Sheets

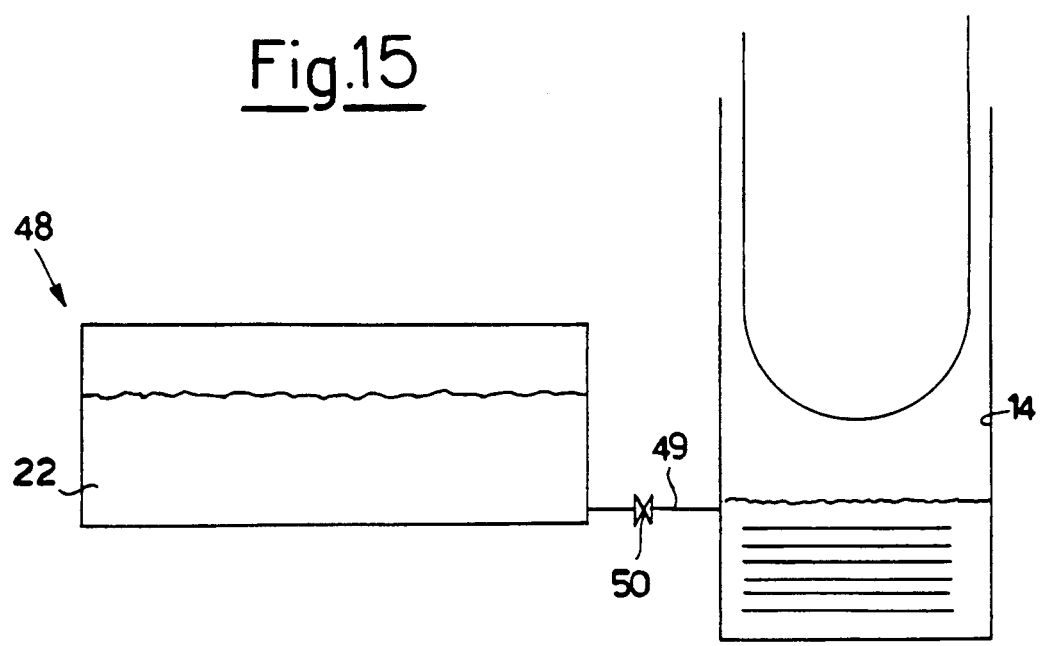

PROTECTION SYSTEM FOR THE BASEMAT REACTOR CONTAINMENT BUILDINGS IN NUCLEAR POWER STATIONS

FIELD OF THE INVENTION

This invention relates to a protection system for the basemat of reactor containment buildings in nuclear power stations.

A protection system for the basemat of reactor containment buildings which is able to minimize damage deriving from melt-down of the reactor core is of extreme importance in a nuclear power station. This is an extremely sever accident which occurs when there is a melt-through of the reactor pressure vessel.

BACKGROUND OF THE INVENTION

The lower part of the reactor pressure vessel is normally housed in a lower chamber (a reactor cavity) in a position in the basemat of the reactor containment building.

If the core melts down, as a consequence of a severe accident, the resultant molten material could perforate the bottom of the pressure vessel and pour into the underlying lower chamber and over the basemat. The basemat is usually made of concrete with a steel liner embedded therein to ensure a leak-tight seal. In the case of an accident, molten material erodes the basemat then penetrates into the ground where it cools, releasing radioactivity and contaminating the environment around the power station.

Nuclear reactors which are used for commercial power stations can be of different types, depending upon the coolant used (light water, heavy water, sodium, helium, carbon dioxide, etc.);
the neutron energy spectrum (thermal i.e slow neutrons, or fast neutrons); or
the fuel used (uranium dioxide, uranium metal, uranium alloy, etc.) and its enrichment in Uranium-235.

Among the water cooled reactors the more common are:
Pressurized Water Reactors (PWR)
Boiling Water Reactors (BWR)
Heavy Water Reactors (HWR).

They are all thermal neutron reactors and use, as fuel, low enrichment uranium dioxide; the fuel pellets are stacked and sheathed in metal cans (usually Zircalloy or stainless steel); clusters of these fuel pins make up the fuel element; and hundreds of fuel elements make up the reactor core.

The reactor core is normally housed in a pressure vessel, which is a part of the primary circuit. In addition to the pressure vessel, the primary circuit is, typically, made up of pipes, heat exchangers and pumps which are needed for the circulation of the coolant (water) and for the transfer of heat from the core to the heat exchangers.

The entire primary circuit (and some auxiliary circuits) are housed in a containment building. This is capable of containing, the primary coolant and radioactive products which, in case of an accident, might escape from the primary circuit.

The containment building comprises the last barrier to the release of radioactive products to the environment in case of an accident.

During normal reactor operation, radioactive products build up in the fuel and are retained in the fuel matrix inside the metal can. During an accident, there is a temporary mismatch between the heat produced in the fuel and the heat removed by the coolant (the first being larger than the second) and the fuel starts to overheat. Even if the reactor is shut down, with the insertion of control rods or coolant poisoning (boration), decay heat (a few percent of the nominal thermal power) continues to be generated inside the fuel. This is because of the accumulated radioactive products. If an emergency core cooling system (ECCS), is actuated, the temporary mismatch is overcome and the reactor is put back into a safe condition. If, on the other hand, the ECCS, for some reason is not actuated, the mismatch between heat produced and heat removed continues. This causes fuel overheating. If the ECCS function is not recovered in time, the fuel melts. The melting core falls to the bottom of the pressure vessel. It is then possible to have a meltthrough of the pressure vessel. In fact, this can occur even if the emergency cooling function is recovered, due to the low surface-to-volume ratio in the melt which accumulates on the bottom of the pressure vessel. The molten core which is mixed with the molten structural material is normally referred to as "Corium".

Even if the reactors are equipped with (1) redundant ECCS systems, (2) can be fed by onsite power supplies in case of loss of offsite power, (3) their design takes into account all the foreseeable accident loads, and (4) they are regularly tested and inspected, in the framework of the so-called "defense-in-depth" concept which permeates the approach to the safety of nuclear power plants, in recent times serious attention is being given to the degraded situation in which the ECCS is not operating. To protect the public and the environment from these improbable circumstances specific design features must be introduced.

Once a molten core has breached the pressure vessel bottom and has fallen into the cavity below, it is important to preserve the integrity of the containment building and the leaktightness to limit the release of radioactivity to the environment. Such a severe accident poses three main challenges to the containment integrity:

1) Containment Slow Overpressurization. This problem can be overcome either by the operation of a containment heat removal system (if the system is passive or if power is available for active systems) or by the existence of containment filtered venting. Several nuclear power plants have been equipped with filtered venting systems.

2) Hydrogen Deflagration or Detonation. Hydrogen is produced during the accident evolution by the oxidation of superheated metal. To avoid this problem there are various means: a) containment inerting with nitrogen (if the containment is small), b) burning of the hydrogen by means of ignitors before its concentration reaches too high a value, c) hydrogen dilution in large containment buildings. Solutions to the hydrogen problem have been introduced into several nuclear power plants although further progress is needed in this area. In any case, any means capable of reducing the quantity of hydrogen produced is a desirable feature.

3) attack of the containment concrete basemat by the molten corium.

Existing solutions can be grouped into two broad categories:

"core catchers", such as that described in U.S. Pat. No. 4,036,688 (Golden) in which a bed of refractory material is used to protect the containment basemat;

solutions such as that of U.S. Pat. No. 3,503,849 (West) which require (i) a considerable enlargement of the cavity cross section below the vessel to spread the corium into a thin layer, and (ii) a set of cooling pipes below the bottom of the cavity, to remove the heat from the corium.

The solution proposed by Golden (U.S. Pat. No. 4,036,688) involves installing under the reactor pressure vessel a crucible of refractory material which should retain any molten material from the pressure vessel, so as to prevent its interaction with the basemat.

This solution has at least two drawbacks.

Firstly, heat transfer from the melt-down is minimal because of the refractory crucible and upwards is minimal because of the low heat transfer coefficient of air, with the result that the temperature of the molten material increases well above the melting point and that there is internal heat generation. The consequence is that in the long term the refractory crucible itself is eroded and fails to retain the molten core.

Secondly, a large fraction of the radioactive products is released by evaporation from the molten material into the reactor containment building, with a consequent increase in the release of radioactivity into the environment.

Another proposed solution by West (U.S. Pat. No. 3,607,630) relates to spreading the molten core into a flat thin layer over the basemat and removing the heat by means of cooling pipes embedded in the base wall.

However, this solution requires a cavity having a very large cross-section. If the spreading area in not large enough an excessive temperature gradient arises through the base wall with the danger of its fracturing and the possibility of the molten material attacking the pipes. If this happens, the fission products can escape into the external environment.

This invention is a solution to this last problem (without worsening the other two). Other solutions have been proposed in the past to this problem but they have been based on an entirely different approach.

The present solution, which could be defined as a "core quencher", envisages the subdivision of the molten corium into a series of vertical layers and the cooling of it by direct transfer of heat to the cooling water into which the subdividing structure is immersed.

SUMMARY OF THE INVENTION

The object of the present invention is to propose a safeguard against such an attack of the molten core on the basemat of the reactor containment building. Such a safeguard represents a valid and effective solution to the problems of reactor core melt-down thereby preserving the integrity and seal of the basemat and avoiding the release of radioactivity to the environment.

This object is attained by a protection system for the basemat of the reactor containment building in nuclear power stations, in which the structure is located in a cavity below the reactor vessel, and is submerged in water. The structure is for intercepting molten material which can originate from the reactor during melt-down of the reactor core, and distributing the molten material over a large heat transfer area. This is accomplished by distributing the molten material into thin layers over various beams and then cooling the molten material by directly transferring its heat to the surrounding water. The flooded cavity housing the structure is lined with a stainless steel liner. This is to avoid seepage of water through the concrete. The water may or may not be borated depending upon the type of reactor under consideration.

BRIEF DESCRIPTION OF THE DRAWINGS

One embodiment of the present invention is described hereinafter by way of non-limited example with reference to the accompanying drawings, in which:

FIG. 15 is a schematic illustration of a modification of the protection system of FIG. 1;

DETAILED DESCRIPTION OF THE INVENTION

Figure 1:
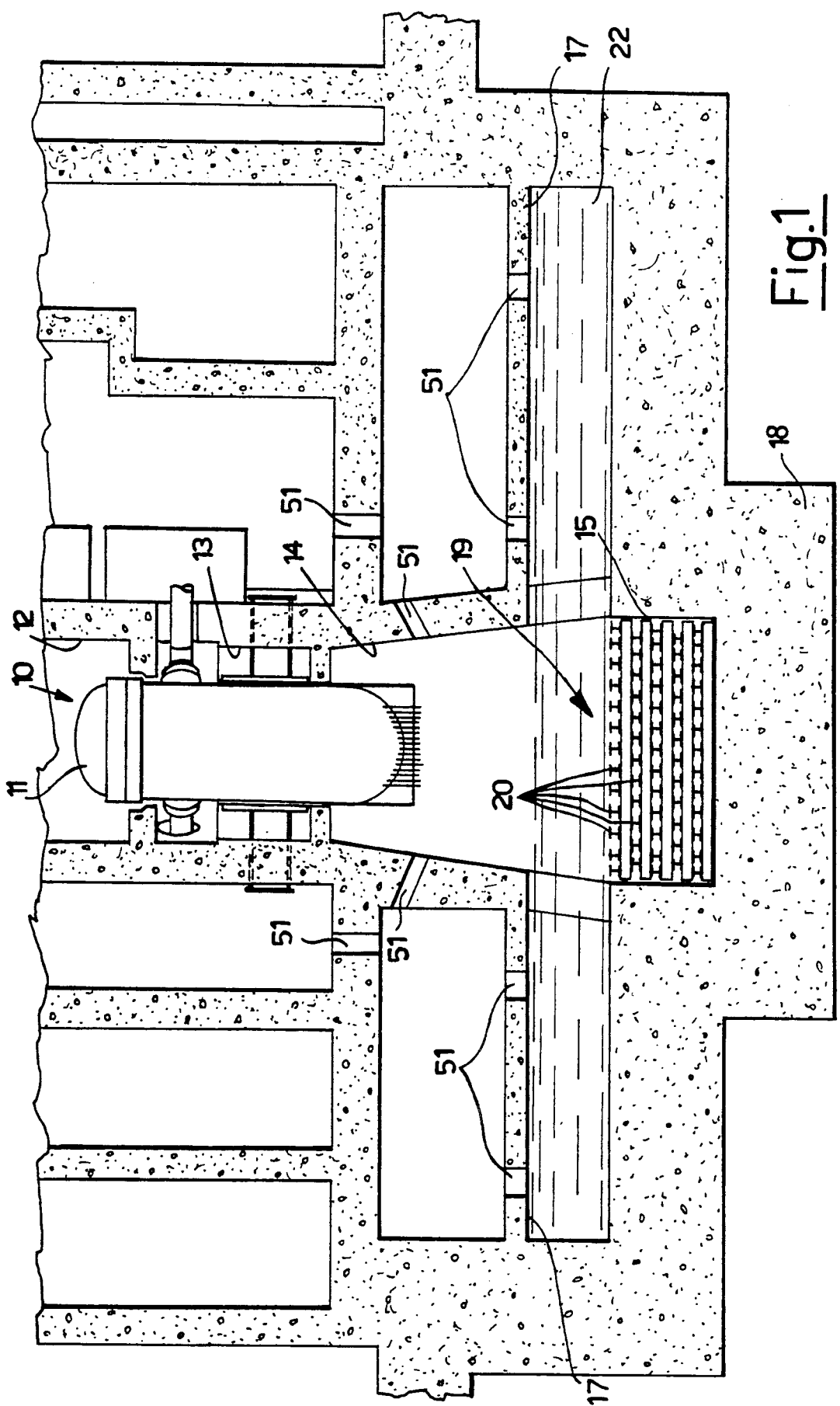
FIG. 1 shows a protection system for the basemat of the reactor containment building according to the invention.

FIG. 1 represents a vertical section through the lower part of a reactor containment building of a nuclear power station.

In this figure the pressure vessel 11 which contains the core of the reactor 10 can be seen.

The lower portion of the pressure vessel 11 protrudes into the lower chamber 14 (called the reactor cavity) and which comprises a base portion 15.

The base portion 15 of the lower chamber 14 is above the containment basemat portion 18. The base portion 15 of the lower chamber 14 houses a structure 19 formed by various layers of beams 20. There are also two lower side chambers 16 and 17 which are filled with water and which extend from the lower chamber 14 and communicate with it.

Figure 2:
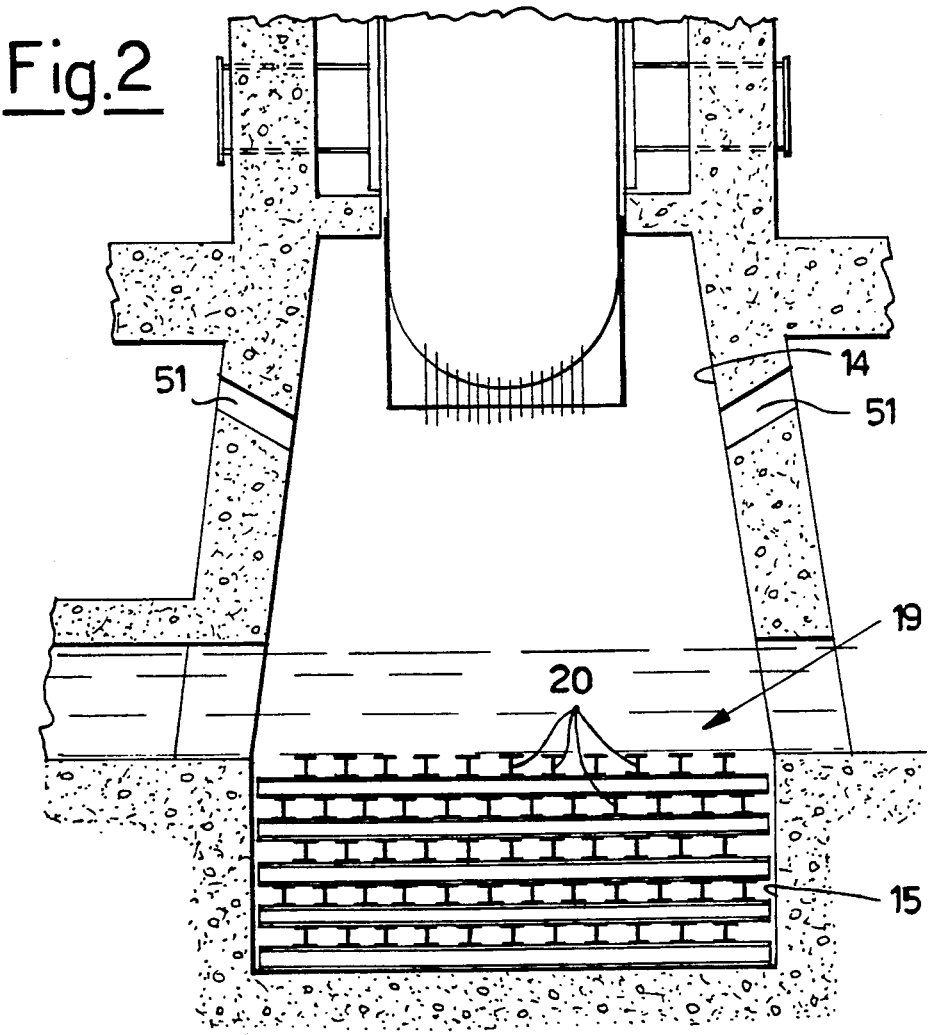
FIG. 2 is a detailed view of the protection system of FIG. 1.

FIG. 2 is an enlarged detailed view of the chamber 14 with its base portion 15 and structure 19.

Figure 3:
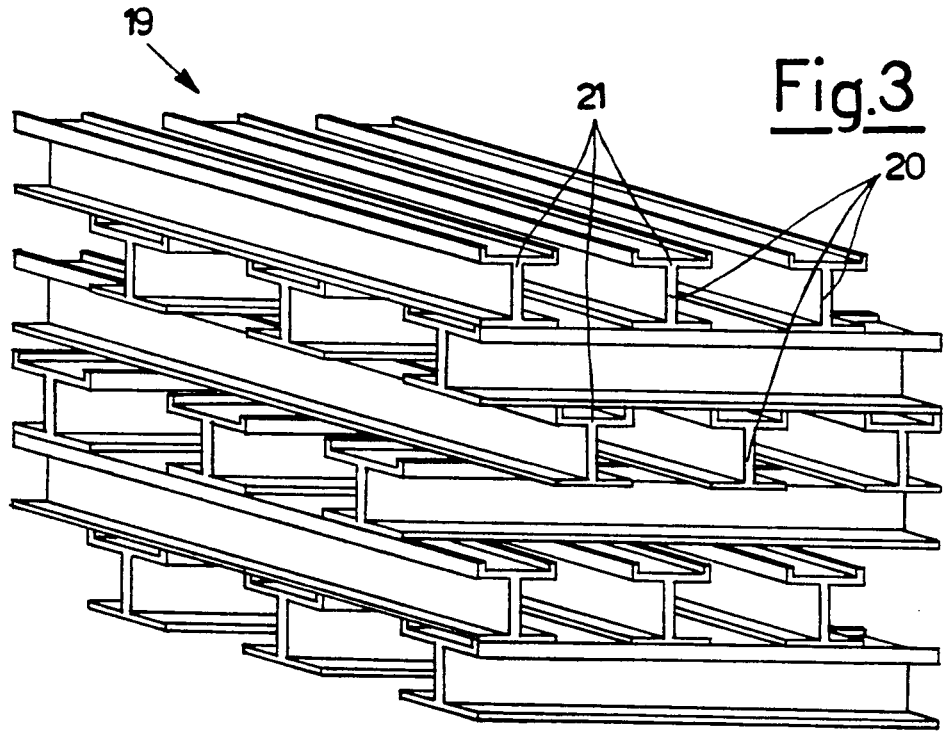
FIG. 3 is a perspective view of a structure of the protection system of FIG. 1.

FIG. 3 is a detailed partial view of the structure 19.

In the structure 19 each layer of beams 20 is composed of a series of parallel beams. In addition, the axes of the beams 20 of one layer are disposed at 90° to the axes of the beams 20 of an adjacent layer. Finally, the beams 20 of a determined layer are offset from the beams 20 of the next alternate layer for intercepting the debris spilling over from the upper layer. Preferably, each beam 20 of said determined layer is positioned to correspond with the space existing between two adjacent beams 20 of said next layer.

Each beam 20 has an I cross-section, the upper flange 21 of the beam preferably being of U shape. The beams are constructed of stainless steel or similar material capable of being submerged without appreciable corrosion. They have a melting temperature high enough to exceed the maximum calculated interface temperature.

The lower part of the chamber 14, and therefore including the base portion 15, and the side chambers 17 are filled with water 22, which may be borated if necessary (as in PWR). In this way, the structure 19 is submerged in the water 22 with a water head above. If the core of the reactor 10 melts down, the resultant molten material perforates the pressure vessel 11 and falls into the water 22 and descends towards the structure 19. Upon contact with the structure 19, the molten material is obliged by the structure to follow the path partly shown in FIG. 4, in which the molten material is indicated by 23. Basically, the structure 19 compels the descending molten material 23 to follow a very tortuous path so that the molten material is subdivided and distributed so that is spreads throughout the structure 19 in layers. In this manner the molten material is quickly cooled and solidified by transferring most of the heat to the surrounding water. Practically no debris reaches the bottom of the portion 15 and therefore the integrity of the foundation bed 18 is maintained.

Essentially, a large surface area of the molten material is obtained in relation to its volume, i.e. the molten material is distributed over a large heat transfer surface, and is subdivided into various layers to allow rapid and efficient cooling of the molten material itself. In this way, a protection system for the basemat of the reactor containment building is provided which represents a valid and effective solution to the initially stated problems deriving from the melt down of the reactor core.

Figure 4:
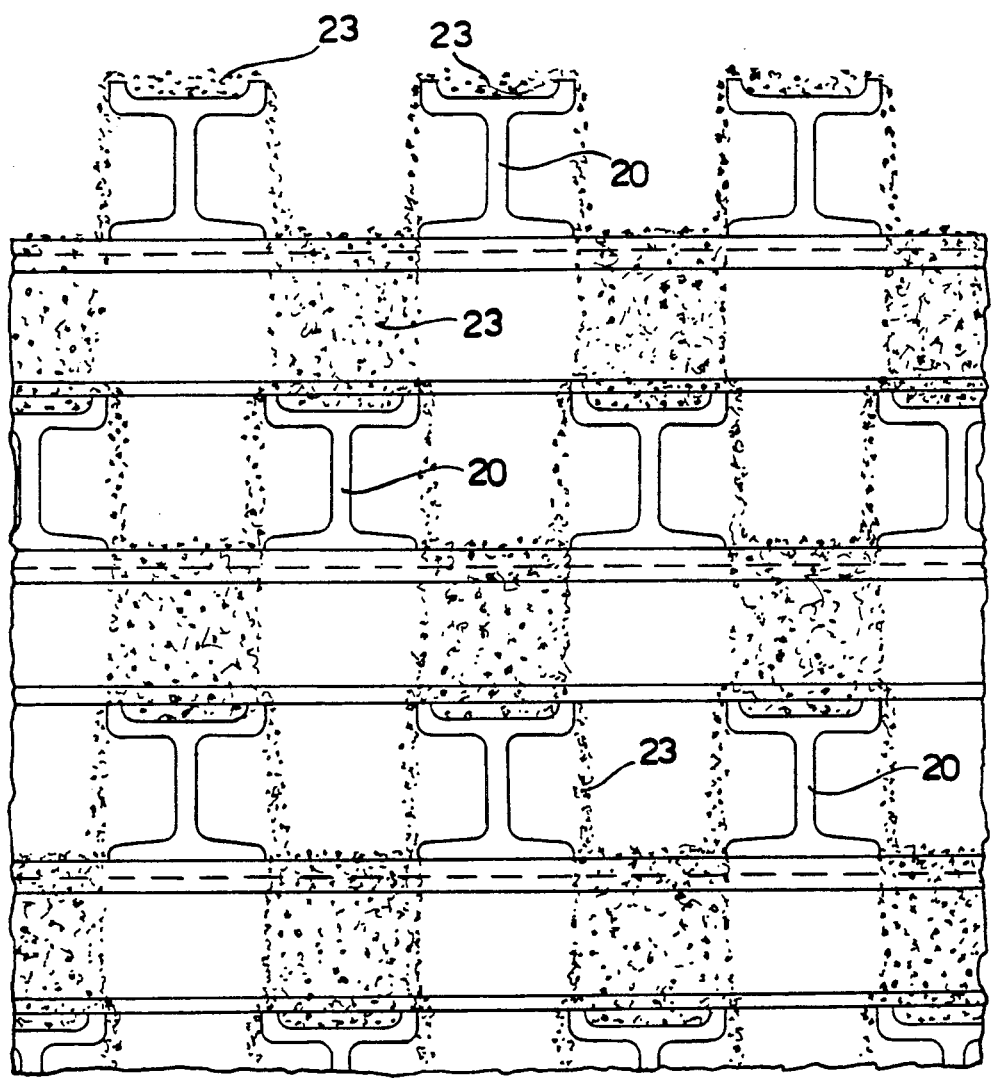
FIG. 4 shows the structure of FIG. 3 with molten material flowing over it and being distributed upon the various beams.
Figure 5:
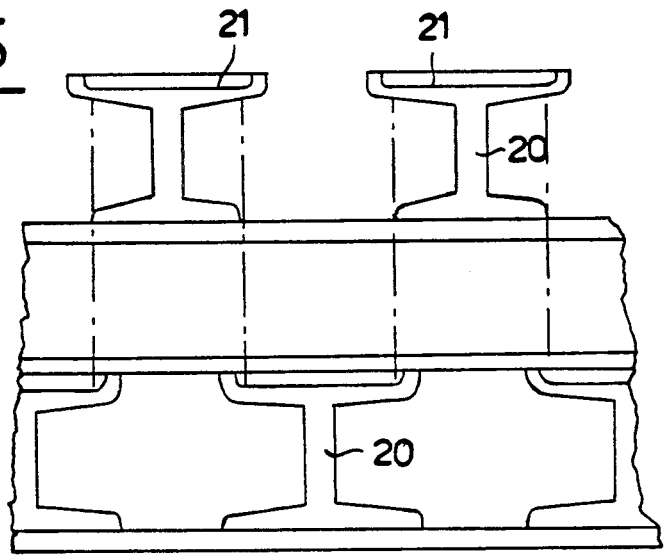
FIG. 5 shows a modification of the component elements of the structure of FIG. 3.

It should be noted that such a protection system is very simple and consequently economical. It can be easily assembled and disassembled. Moreover, its simplicity and the absence of active components makes it particularly reliable. The U shape of the upper flanges 21 of the beams 20 results in channels which are better able to retain that portion of the molten material which is deposited on these flanges, as can be seen in FIG. 4, and which therefore ensures better distribution of the molten material among the layers of the structure 19. The flanges 21 of each layer of beams can also partially overlie the flanges 21 of the layer of underlying beams which extend in the same direction, i.e. parallel to the former as shown in FIG. 5. This ensures that all the molten material which falls from the channels formed by the overlying flanges 21 collects in the channels formed by the underlying flanges 21, so improving the distribution and stratification of the molten material.

The lower flanges of the beams could also be made of U shape as the upper flanges, in order to retain further portions of molten material.

Figure 7:
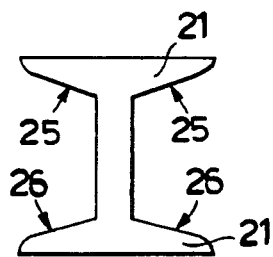
FIG. 7 shows a modification of the component elements of the structure of FIG. 3.

In a simplified embodiment of each beam 20, both the upper flanges 21 and the lower flanges 24 can be flat, as shown in FIG. 5. Alternatively, both the upper flanges 21 and the lower flanges 24 can have inclined walls 25 and 26 respectively, as shown in FIG. 7. This prevents vapour bubbles from settling on these walls which hinders heat transfer between the beam and the water. Composite beams, i.e. beams formed from differing materials and pieces are convenient, for example, a beam of stainless steel with an upper portion made of a material more resistant to high temperature than stainless steel.

Figure 8:
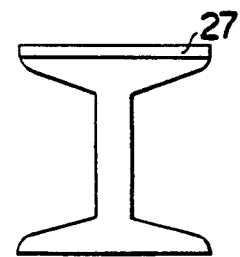
FIG. 8 shows a modification of the component elements of the structure of FIG. 3.

FIG. 8 shows for example the beam of FIG. 7 with an upper portion 27 which is made of a different material.

Figure 6:
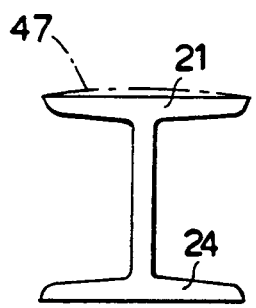
FIG. 6 shows a modification of the component elements of the structure of FIG. 3.
Figure 9:
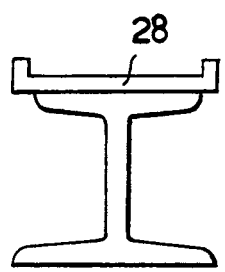
FIG. 9 shows a modification of the component elements of the structure of FIG. 3.

FIG. 9 shows a beam with a body similar to that of FIG. 6 with an upper U-shaped channel 28 which is made of high-temperature resistant material. This acts as the collection channel for the molten material.

Figure 10:
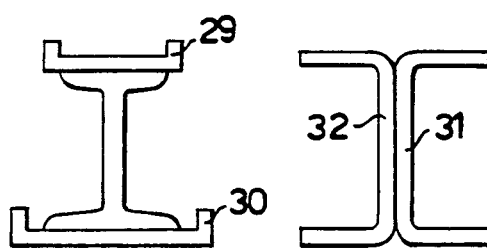
FIG. 10 shows a modification of the component elements of the structure of FIG. 3.

FIG. 10 shows a beam with a body similar to that of FIG. 6 with an upper channel 29 and a lower channel 30. Both of these channels are made of stainless steel or high-temperature resistant material. They are both made in a U shape with the flanges facing upwards.

Figure 11:
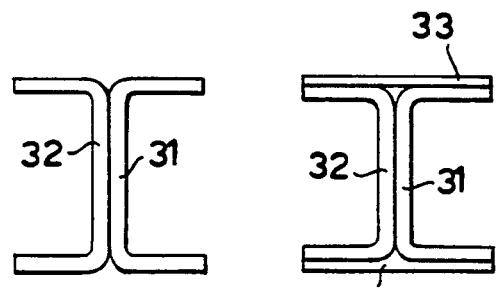
FIG. 11 shows a modification of the component elements of the structure of FIG. 3.

As shown in FIG. 11, the beam can also be formed from two plates 31 and 32 which are each bent to form a C-shape and are joined together so that the flanges all point outwards.

Figure 12:
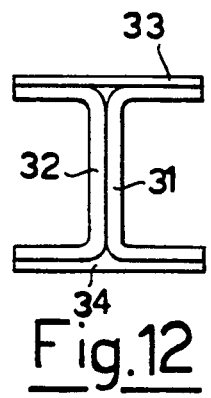
FIG. 12 shows a modification of the component elements of the structure of FIG. 3.

FIG. 12 shows the beam of FIG. 11 formed from the two plates 31 and 32, and provided with an upper cover 33 and a lower cover 34.

The described beams, whatever their configuration and composition, can be rigidly connected to each other at their intersection, such as by welding or bolting, or by means of straps which allow free differential expansion of the beams, so as to form a block structure which maintains its initial geometry even when localised pressure forces are present, generated by the violent interaction between the molten material and the cooling fluid present in the portion 15.

Figure 13:
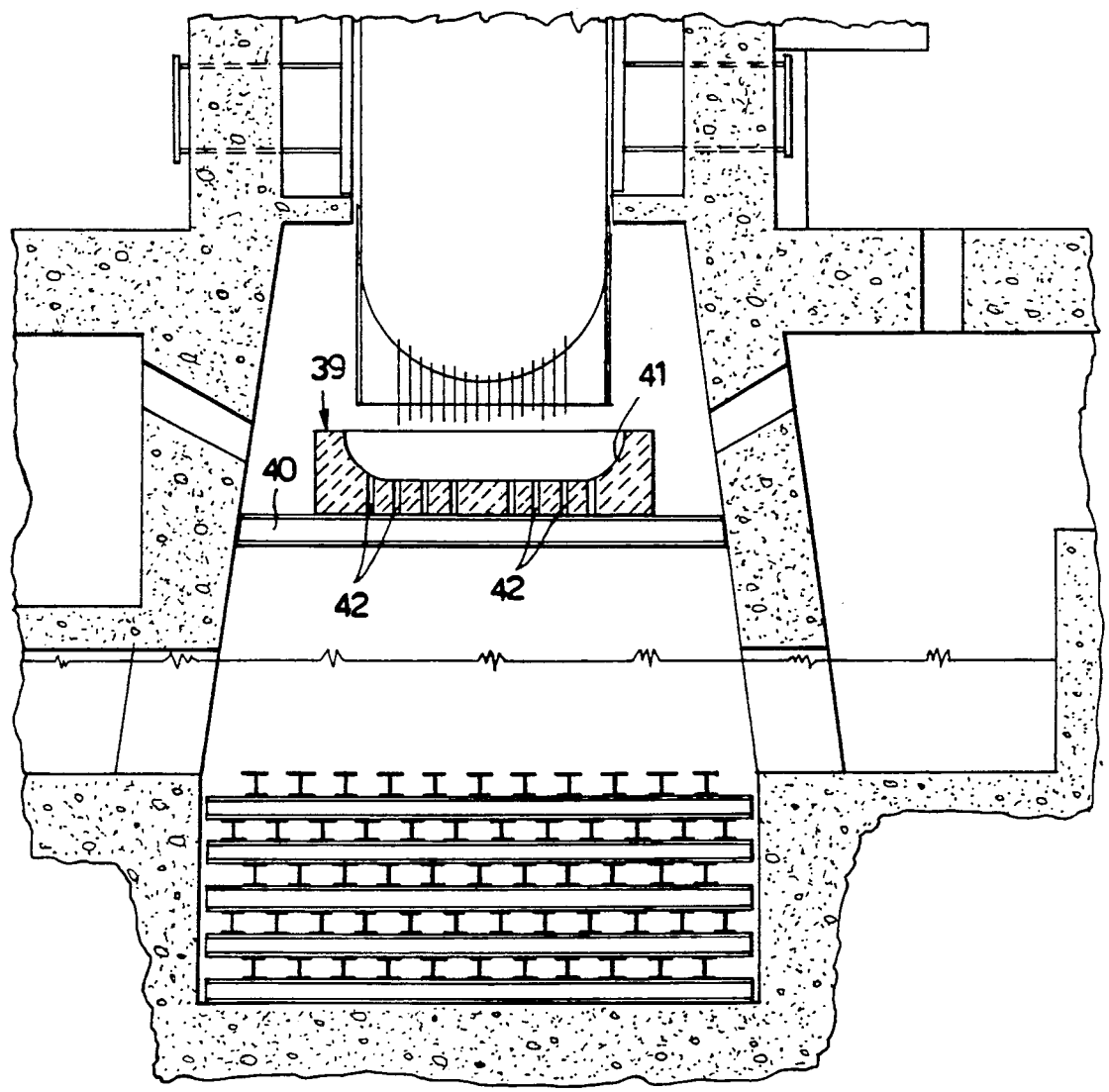
FIG. 13 shows the protection system illustrated in FIG. 2 but with an additional structure for slowing down the fall of the molten material on the structure.

A structure for temporarily collecting and distributing the molten material can be mounted below the reactor vessel 11 and above the water level as shown in FIG. 13.

This structure, which is indicated by 39 and is supported by a support base 40, comprises a collection cavity 41 in which the molten material falling from the reactor 10 is collected, and also comprises a series of through holes 42 for distributing the molten material over the underlying surface of the water pool.

The purpose of the structure 39 is to avoid the risk of "vapor explosions" due to the violent conversion of heat energy into mechanical energy which could occur when large quantities of molten material come into contact with water in a very short time. It is also to provide pre-distribution of the molten material over a larger area of cooling fluid surface.

The structure 39 could also be located in the water just above the structure 19. However, this does not obviate the risk of "vapor explosions", although said predistribution of the molten material is obtained. If a reactor can be constructed with a well of the chamber 14 which can withstand a steam explosion, the design can exclude the structure 39.

Figure 14:
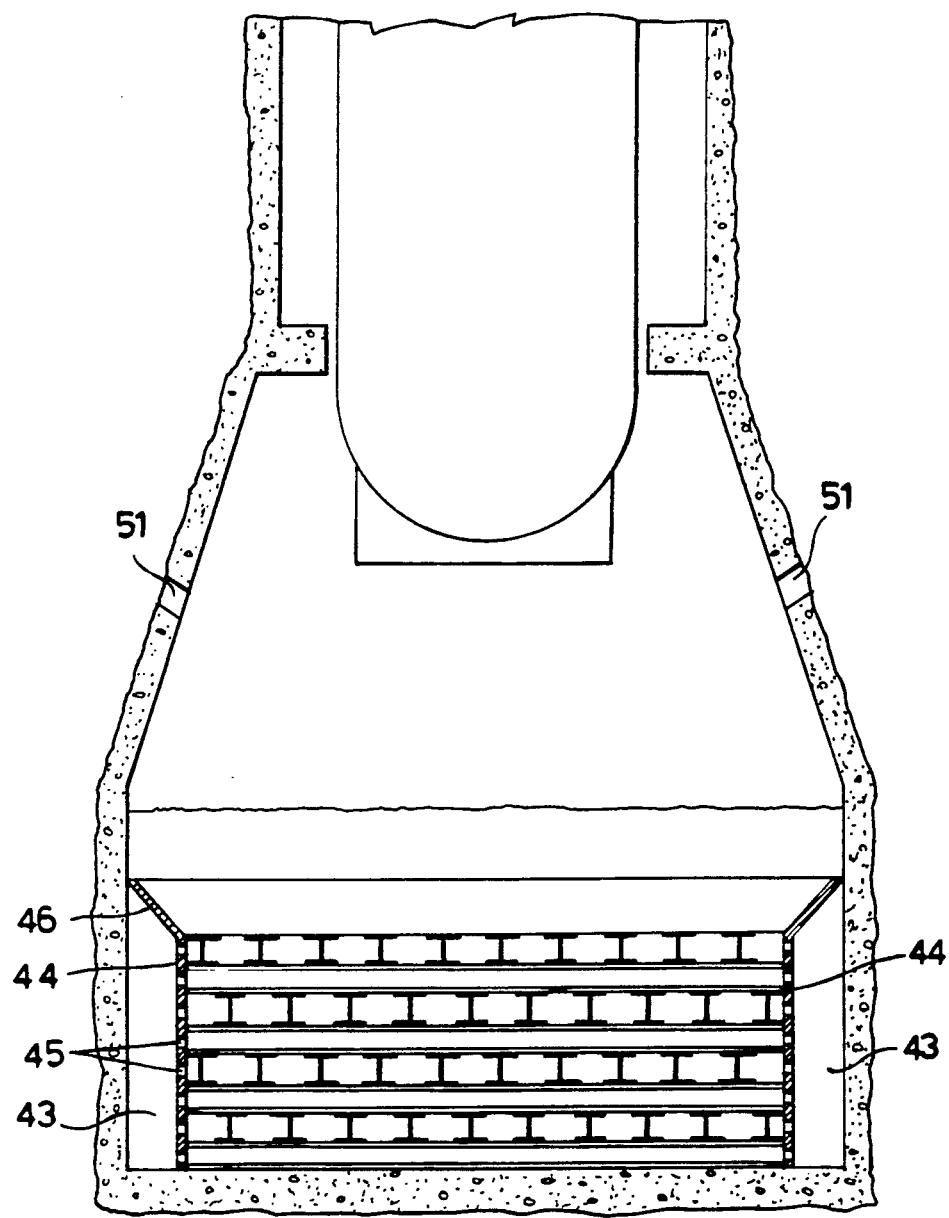
FIG. 14 shows a modification of the protection system illustrated in FIG. 2.

A space can also be left around the structure 19 to allow inspection and facilitate assembly and dismantling of the structure 19, as shown in FIG. 14. The space is indicated by 43 and is provided with a shroud 44 which comprises through holes 45 and has an upper funnel-shaped portion 46 which does not comprise holes. The holes 45 allow cooling fluid communication between the spaces of the structure 19 and the space 43, so that cooling fluid is available throughout the entire base portion 15 of the chamber 14. The funnel-shaped portion 46 of the cover 44 conveys the molten material descending towards the structure 19, so avoiding the risk of the molten material by passing the structure 19 and contacting the basemat.

After the molten material has been redistributed within the structure 19 and has cooled, it must be kept covered with water. This aim can be achieved in different ways: a) the evaporating water must be condensed either by active or passive means and be allowed to flow back to the cavity 14; b) the amount of water present in the cavity 14 and the adjoining chambers must be large enough to have ample time to restart the cooling system as required.

The side chambers 16 and 17 which communicate with the chamber 14 and shown in FIG. 1 are provided for the purpose described in (b) above. They are able to contain a large reserve of cooling fluid.

Alternatively, as illustrated schematically in FIG. 15, the side chamber or chambers can be replaced by a reserve tank 48 located inside or outside the building containing the reactor 10 and filled with water 22. The tank 48 communicates with the chamber 14 for example, via a pipe 49 containing a valve 50. In the case of an emergency, when the molten material escapes from the pressure vessel 11, the valve 50 can be operated either manually by the operator or by a temperature sensor positioned in proximity to the reactor 10, and thus connect the tank 48 to the chamber 14.

Passages 51, visible overall in FIG. 1, are provided in the internal walls of the reactor containment building to enable the steam which forms in the chamber 14 and side chambers 16 and 17 by evaporation of the water to flow into other chambers of the containment building in which the steam can be cooled and condensed by active or passive cooling means or be conveyed to the outside through filters when the pressure exceeds a predetermined value. In the first case, the condensed steam flows back into the chamber 14 and side chambers 16 and 17 through the passages 51, and therefore such side chambers could be dispensed with, as the evaporated water is continuously recovered.

The chamber 14 might require a slight increase in cross-section in the direction towards the structure 19, to enable the structure 19 to have a large collection area.

This structure could also combine beams of different shapes. For example, the initial upper layers could consist of I beams with flat flanges, such as those shown in FIGS. 6, 7, 8, 11, and 12, whereas all the other lower layers could consist of I beams with U-shaped flanges such as those shown in FIGS. 3, 4, 5, 9, and 10. This combination is useful in preventing damage to the initial upper layers of the structure. In this respect, the molten material which is still at a high temperature remains on these initial beam layers only as a very thin layer because of the flat flanges of these latter, and tends to spill over and stop on the beams with U-shaped flanges of the lower layers, by which time its temperature is reduced.

To further reduce the depth of molten material which remains on the upper flange 21, it may be advisable to shape these flanges with an upperly facing convexity, as indicated by the dashed and dotted line 47 in FIG. 6.

The beams can be of a material other than stainless steel. In this case the cooling water (borated, if necessary, as in a PWR) must be treated chemically to prevent rusting of the beams. Alternatively, the beam material can be alloys resistant to high temperature (supersteels, superalloys) generally containing one or more of the following elements: chromium, nickel, tungsten, molybdenum, niobium, tantalum and cobalt.

The beams do not necessarily have to be of I cross-section, but can be of any other useful shape, such as C, L, T, Z etc.

The dimensional ratios of the various component portions of each beam can also vary.

The beam arrangement can follow a geometry different from that described and illustrated.

For example, the beams of adjacent layers do not necessarily have to be rotated 90°. The angle between the adjacent layers can be of angles other than 90°.

The shape of the chamber below the reactor and of the stack of beams can be of various shapes, for example, the plan section can be circular, polygonal, rectangular, or any other shape. The vertical section can be either flared as in the example, or not flared.

The structure on which the molten material is distributed and cooled does not necessarily have to consist of beams as described, but generally has to be able to intercept the molten material in such a manner as to distribute it over a large heat transfer area (possibly in three dimensions so as to maintain a limited cross sectional area of the cavity).

An alternative embodiment to those described could for example be a structure formed from an accumulation of cobblestones of siliceous or other inert material. For example, the molten material which penetrates between them can acquire a dendritic configuration which enables the molten material to cool and solidify before it reaches the bottom of the chamber. Instead of cobblestones, tetrapods of concrete or other refractory material similar to those used for jetties or artificial islands could be used. The tetrapods would then lock together to make the mass semi-monolithic.

It is apparent that such a protection system can be applied to any type of water cooled reactor (PWR, BWR, or HWR) and to any type of reactor containment building for example, large, dry, pressure suppression, etc.

I claim:

1. A device for protecting a basemat of a reactor containment building of a nuclear power station against degradation by a flow of molten material emanating from a reactor during an accident in the nuclear power station, wherein the reactor is a pressure vessel and the containment building has a cavity therebelow, wherein the device comprises a structure located in the cavity, wherein said structure comprises layers of stainless steel beams, and wherein said beams are immersed in water so that said layers of beams intercept and quench the flow of molten material during an accident in a nuclear power station.

2. The device of claim 1, wherein each layer of said layers of beams are disposed at an angle to one another.

3. The device of claim 2, wherein said angle that said each layer of said layers of beams are disposed to one another is substantially 90°.

4. The device of claim 1, wherein each layer of said layers of beams are disposed parallel to one another and wherein beams in each layer are offset from one layer to another.

5. The device of claim 4, wherein said beams in each layer partially overlap beams in a next adjacent layer.

6. The device of claim 1, wherein said beams have an I cross-section.

7. The device of claim 6, wherein said beams comprise a U-shaped upper flange.

8. The device of claim 6 or 7 wherein said beams comprise a U-shaped lower flange.

9. The device of claim 6, wherein said beams comprise a flat upper flange and a flat lower flange.

10. The device of claim 6, wherein said beams comprise an upper flange having an upwardly facing convexity.

11. The device of claim 6, wherein said beams comprise a lower flange having inclined lower sides.

12. The device of claim 6, wherein said beams comprise two joined C-shaped elements.

13. The device of claim 6, wherein said beams comprise an upper flange, wherein said upper flange differs in its material composition from stainless steel.

14. The device of claim 13 wherein said upper flange comprises a superalloy.

15. The device of claim 1 further comprising a perforated structure interposed between the pressure vessel and said structure for temporarily restraining the flow of molten material prior to contact with said structure.

16. The device of claim 1, further comprising a perforated shroud surrounding said structure, wherein said shroud has a non-perforated funnel upper shaped portion and wherein said funnel portion extends outwardly a distance from said shroud to a wall of the cavity thereby defining a space therebetween for inspection of said structure.

* * * * *